Sept. 27, 1966 G. PEREZ 3,275,258

TAPE REELING APPARATUS

Filed April 24, 1963

INVENTOR
GUILLERMO PEREZ

BY Thomas S. Ross
Joseph R. Spalla
ATTORNEYS

United States Patent Office 3,275,258

Patented Sept. 27, 1966

3,275,258
TAPE REELING APPARATUS

Guillermo Perez, Bristol, Conn., assignor, by mesne assignments, to Royal Typewriter Company, Inc., New York, N.Y., a corporation of Delaware Filed Apr. 24, 1963, Ser. No. 275,422
4 Claims. (Cl. 242—75.5)

This invention relates to tape reeling apparatus; more particularly it relates to a tape reeling apparatus characterized by improved mechanism for controlling tape loops between a tape supply reel and a tape processing unit and between a tape processing unit and a tape take up reel.

Tape loops have heretofore been employed to reduce the load seen by a tape processing unit on its supply side and to maintain proper tension on its take up side. Prior devices have heretofore required complicated controls to vary the speed of reel motors or to brake the reel motors accordingly as the loops become too short or too long In accordance with the present invention tape loops between reel and processing unit are maintained between predetermined limits by pivoted spring biased arms which are effective at limits of motion or predetermined loop lengths to energize normally quiescent reel motors to replenish the supply loop or take up slack in the take up loop thereby to maintain said loop lengths between predetermined limits.

An object of the invention is to provide simple relatively inexpensive tape reeling apparatus.

Another object of the invention is in the provision of a simple relatively inexpensive tape supply reel mechanism which presents a minimum load to feed mechanism in a processing unit.

Still another object of the invention is in the provision of a simple relatively inexpensive tape take up reel mechanism wherein reflected loads on feed mechanism in a processing unit are maintained at a minimum by maintaining a predetermined tension on a tape emanating from a processing unit.

A further object of the invention is in the provision of motor controlled reels adapted to serve either as supply or take up reels and to motor control means responsive to changes in tape loop lengths between reel and a processing station.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
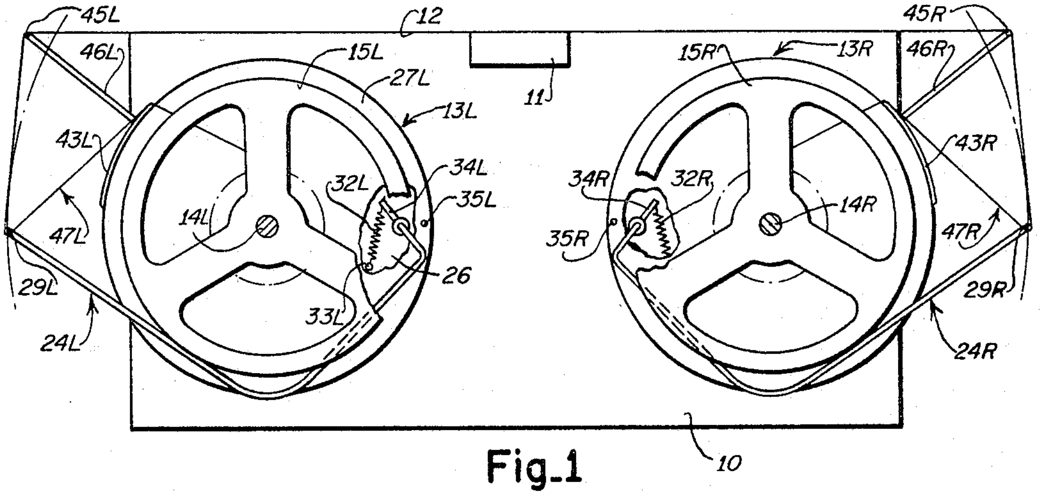
FIGURE 1 is an elevational view of tape reeling apparatus in accordance with the invention.

Referring now to the drawings wherein like reference numerals designate like or corresponding elements throughout the several views there is shown in FIGURE 1 a wall rack 10 on which is mounted a data tape processing station generally designated by reference numeral 11 containing tape indexing mechanism for indexably pulling a perforated tape 12 either to the right or to the left. Secured to the rack to the left and to the right of the processing station are a pair of cylindrical reel motor housings 13L and 13R from which reel drive shafts 14 extend whereby tape reels 15L and 15R may be drivingly mounted thereon. Assuming that tape 12 is to be moved from left to right the reel 15L will serve as a supply reel and the reel 15R as a take up reel. As viewed in the FIGURE 1 the reel drive shafts 14 are horizontally aligned and below the processing station.

Figure 2:
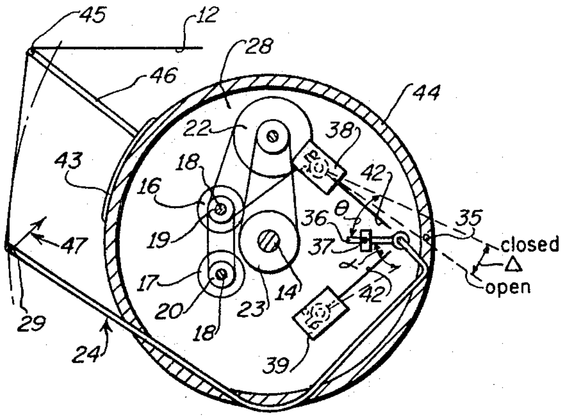
FIGURE 2 is a front elevational view of a reel motor housing and loop control elements with the front cover and mounting plate of the housing removed.

With reference to FIGURE 2 there are shown mounted within each of the housings 13 on the rear cover plates thereof a forward and reverse motor 16 and 17 respectively of the shaded pole type whose shafts 18 have pulleys 19 and 20 secured thereto. Both shaft pulleys are belted to one another and one of the pulleys, i.e. pulley 19, is belted to an intermediate pulley 22 which in turn is belted to a pulley 23 secured to the reel drive shaft 14. Depending on which motor is energized the reel drive shaft 14 will be driven in a forward or counterclockwise or in a reverse or clockwise direction; the shaft of the motor not energized rotating freely as the energized motor is driven.

Figure 3:
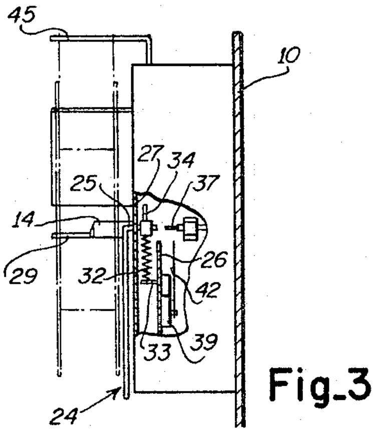
FIGURE 3 is a side elevational view of a reel mounting and tape loop control elements.

With reference to FIGURES 1–3 loop control arms generally designated by reference numeral 24 are pivotally mounted to the right of the supply reel shaft and to the left of the take up reel shaft by way of shaft portions 25 extending through a front cover plate 27 and rotatably supported by a mounting plate 26 (FIGURE 3) located behind the front cover plate 27, and by the rear cover plate 28 of the housings. The mounting plate 26 and rear cover plate 28 are secured together in spaced relationship by cross bars (not shown). The control arms 24 extend around the peripheries of the housings and terminate in bent off tape guide portions 29 which extend into the path of the tape 12 on the opposite sides of the reel housings 13. The loop control arms are biased outwardly from the peripheries of the housings by springs 32 secured to pins 33 on the outer front of the mounting plates 26 of the housings and to arms 34 adjustably secured to the pivot shaft portions 25 of the control arms 24. Limit stops 35 are provided to limit the extent to which the arms may move outwardly. On the shaft portions 25 of the control arms intermediate the mounting and rear cover plates of the housings, radially inwardly directed legs 36 are angularly adjustably secured. Also adjustably secured for axial movement relative to the angularly adjustable legs 36 are switch actuating arms 37 which extend at right angles thereto as viewed in FIGURES 2 and 3. The back side of the mounting plates 26 of the housings mount forward and reverse motor control microswitches 38 and 39 respectively whose movable contact actuating arms 42 lie in the path of the switch actuating arms 37. In the assumed movement of tape 12 from left to right or forward direction the forward switch 38 in the housing 13L will be actuated to its operating point or closed contact position when the control arm 24L moves inwardly or clockwise about its pivot from an intermediate position as viewed in FIGURE 2 through an angle $\theta$ while the forward switch 38R in the housing 13R will be actuated to its operating point or closed contact position when the arm 24R moves outwardly or clockwise about its pivot. Microswitches, as commonly understood in the art, are characterized by a snap or overcentering action. Due to this overcentering action, the contact actuating arms 42 must rotate about their pivots from the contact actuating or operating point through a movement differential or angle before the switch contacts transfer or open. It is to be noted from FIGURE 2 that as the arm 37 is axially moved farther from the pivots of the contact actuating arms, the arcuate distance defining the movement differential angles becomes longer. Accordingly the control arms 24 will of necessity have to rotate through a larger angle to effect a transfer of the switch contacts from operating point to reset point. In this manner the time of motor energization and consequently loop length may be predetermined.

As shown in FIGURE 1 tape 12 from the supply reel 15L is directed around a drag shoe 43L secured to the annular element 44 forming the reel motor housing, around the bent off tape guide portion 29 of the control arm, and around the guide portion 45L of a reference post 46L secured to element 44 of the housing. Portion 45 which is in the path of the tape is located on a horizontal through the processing station and is located slightly beyond the arcuate path of travel of portions 29 of arms 24.

Figure 4:
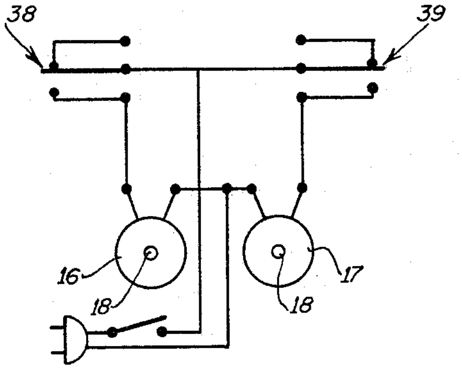
FIGURE 4 is a schematic view of motor control circuitry.

Normally with the processing unit inactive the outwardly biased control arm 24L will be constrained by the operatively mounted tape between its switch operating positions and thereby maintain a tape loop 47L between the reel 15L and the processing station 11. As the tape is drawn through the processing station by the indexing mechanism therein, the length of the loop 47L decreases; the force required to overcome the spring bias being on the order of ounces thereby placing minimum load on the indexing mechanism. When the control arm 24L moves inwardly from the intermediate position shown through a predetermined arcuate distance corresponding to the angle $\theta$ shown in FIGURE 2 under the influence of the pull on the tape, the forward or counterclockwise motor control switch 38L is operated thereby energizing the forward motor 16 which rotates the reel to thereby pay out tape. The tape paid out during the interval of motor energization and as a consequence of reel momentum thereafter permits the spring 32 to bias arm 24L outwardly to the position shown in FIGURE 2 thereby taking up the slack. As the arm 24L moves outwardly through the movement differential the switch 38 resets or transfers to normal, the position shown in FIGURE 4, cutting off the motor; the process repeating again and again.

At the take up side, the tape is similarly directed around a bent off guide portion 45R of a reference post 46R, around the bent off portion 29R of control arm 24R and around a drag shoe 43R to the take up reel. As with control arm 24L the position of the control arm 24R is normally such that the forward switch 38R in the housing 13R which is positioned to be operated when the loop 47R becomes too long is also normal. As tape 12 emanates from the processing unit 11 the arm 24R takes up the slack until it moves through an angle $\alpha$ whereby the forward motor switch 38 in housing 13R is operated energizing the forward or counterclockwise motor 16R which winds the tape, thereby, through the pull on the tape, moving the control arm 24R against the spring force thereof until the loop 47R is shortened and the switch 38R is returned to normal at which time the arm 24R is again permitted to take up slack tape emanating from the unit 11. The process repeats again and again as long as tape moves from the processing unit.

When the right hand reel is the supply and the left hand reel the take up the operation is reversed and it is the reverse switches 39 which are operative by the movement of the control arms 24 through an angle $\theta$ and $\alpha$ thereby effecting operation of the clockwise or reverse motors 17.

It is to be appreciated from the above that the motors are normally quiescent and are energized over very short adjustable intervals such that they never get up to speed. In operation then the control arms 24 oscillate between predetermined limits as determined by the angular movement differential $\Delta$ of the microswitches and by the axial position of switch actuating arms 37 on legs 36; and the motors switch on and off as tape progresses through the processing unit.

The purpose of the drag shoes 43 is to assure that the tape on the reels remains tightly wound when supplying tape and is tightly wound when taking up tape.

Figure 5:
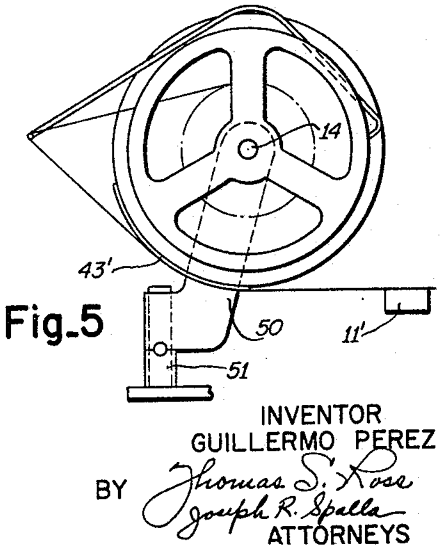
FIGURE 5 is an elevational view of a modified loop guiding arrangement.

With reference to FIGURE 5 there is shown a reel drive housing and loop control mechanism similar to that of FIGURES 1–3 suitable for mounting to a horizontal surface. More particularly the reel shaft housing is secured to a bracket 50 which is removably and rotatably supported by a standard 51 secured to a table top thereby to facilitate the removal or the placement of a reel and/or the removal of the entire tape reel apparatus. As is apparent when the tape transport apparatus is mounted above the data processing station 11' the reference post function may be accommodated by the drag shoe 43' as shown in FIGURE 5.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Tape reeling apparatus comprising a cylindrical housing,
   - forward and reverse motor means mounted within said housing,
   - a reel drive shaft axially mounted in said housing and adapted to be driven by said motor means,
   - a control arm pivotally mounted in said housing having a tape guide bar extending into the path of travel of tape between a mounted tape reel and a tape processing station,
   - spring means rotatably biasing said control arm in a direction such that a tape loop is produced between said reel and processing unit,
   - and first and second microswitches associated respectively with said forward and reverse motor means mounted within said housing and operative from a normal to an active state upon movement of said control arm to predetermined arcuate limits, said microswitches being adapted in said active state to energize an associated one of said motor means, said energized motor means effecting according to which microswitch is operative the winding or unwinding of tape from said reel whereby said control arm is moved by said tape or by said spring means to a position between said arcuate limits of motion, said microswitches being operative from active to normal state upon movement of said control arm through a predetermined angle from said arcuate limits.

2. A tape take up-supply reel apparatus comprising a shaft adapted to be driven in clockwise and counterclockwise directions,
   - a clockwise and a counterclockwise motor adapted to drive said shaft,
   - a tape reel adapted to be mounted on said shaft whereby as said shaft is driven in one or the other direction tape is wound or unwound therefrom,
   - a pivoted tape loop control arm adapted to maintain a tape loop within predetermined limits between said reel and a tape processing unit,
   - spring means for biasing said control arm to one of two predetermined arcuate limits of motion,
   - and first and second microswitches respectively operative from a normal to an active state by said control arm at said limits of motion for energizing said clockwise and counterclockwise motors, said arm being normally constrained between said arcuate limits by a tape extending between said reel and said processing unit, said arm being movable toward said first switch operating position under the influence of said spring means as said loop length increases, and toward said second switch operating position as said loop length decreases due to the processing of tape by said unit, said motors being transiently operative to wind and unwind tape accordingly as said loop length increases beyond or decreases below said predetermined limits whereby said control arm moves from said arcuate limits to effect the operation of said microswitches from active to normal state after moving through a predetermined angle.

3. In combination with a data processing unit, a frame, a shaft rotatably mounted in said frame, a tape take-up reel mounted on and for rotation with said shaft, a normally quiescent motor adapted when energized to drive said shaft and reel thereby to wind tape on said reel, means for taking up tape emanating from said processing unit comprising a tape loop control arm pivotally mounted on said frame.

means biasing said control arm to form a tape loop between said reel and processing unit and to maintain said tape loop tensioned, said loop control arm having a switch operating part, and a frame mounted microswitch having a pivotally mounted contact actuating arm positioned in the path of spring biased movement of said switch operating part and movable thereby to close said microswitch contacts upon movement of said control arm through a predetermined angle, said closed microswitch contacts effecting the energization of said motor whereby as tape is wound on said reel said part is rotated away from said contact actuating arm, said part after being rotated through a predetermined arc determined by the movement differential angle of said microswitch and the distance of said part relative to the pivot of said contact actuating arm permitting the latter to open said microswitch contacts thereof, said switch operating part being adjustable relative to the pivot of said contact operating arm whereby the interval of motor energization may be predetermined.

4. In combination with a data processing unit, a frame, a shaft rotatably mounted in said frame, a tape supply reel mounted on and for rotation with said shaft, a normally quiescent motor adapted when energized to drive said shaft and reel thereby to unwind tape therefrom, means for taking up tape unwound from said reel comprising a tape loop control arm pivotally mounted on said frame, means for biasing said tape loop control arm to take up tape unwound from said reel to form a tape loop between said reel and processing unit and to maintain said tape loop tensioned, said loop control arm having a switch operating part, and a microswitch mounted on said frame having a pivotally mounted contact actuating arm positioned in the path of movement of said switch operating part and movable thereby to close said microswitch contacts upon movement of said control arm through a predetermined angle by the decreasing tape loop as tape is processed by said data processing unit, said closed microswitch contacts effecting the energization of said motor whereby as tape is unwound from said reel said control arm and switch actuating part are rotated by said bias means away from said contact actuating arm, said part after being rotated through a predetermined arc determined by the movement differential angle of said microswitch and the distance of said part relative to the pivot of said contact actuating arm permitting the latter to open said microswitch contacts, said switch actuating part being adjustable relative to the pivot of said contact operating arm whereby the interval of motor energization may be controlled.

References Cited by the Examiner

UNITED STATES PATENTS

| | | | |
|---|---|---|---|
| 2,355,634 | 8/1944 | Doughty | 242—45 |
| 2,681,184 | 6/1954 | Thomas | 242—75.3 X |
| 2,946,534 | 7/1960 | Allendorf | 242—75.51 |
| 2,991,022 | 7/1961 | Wallens | 242—75.51 |

FRANK J. COHEN, *Primary Examiner.*

MERVIN STEIN, STANLEY N. GILREATH, G. F. MAUTZ, *Assistant Examiners.*